(No Model.)
E. P. LYNCH.
WHEEL CULTIVATOR.
No. 389,158. Patented Sept. 4, 1888.
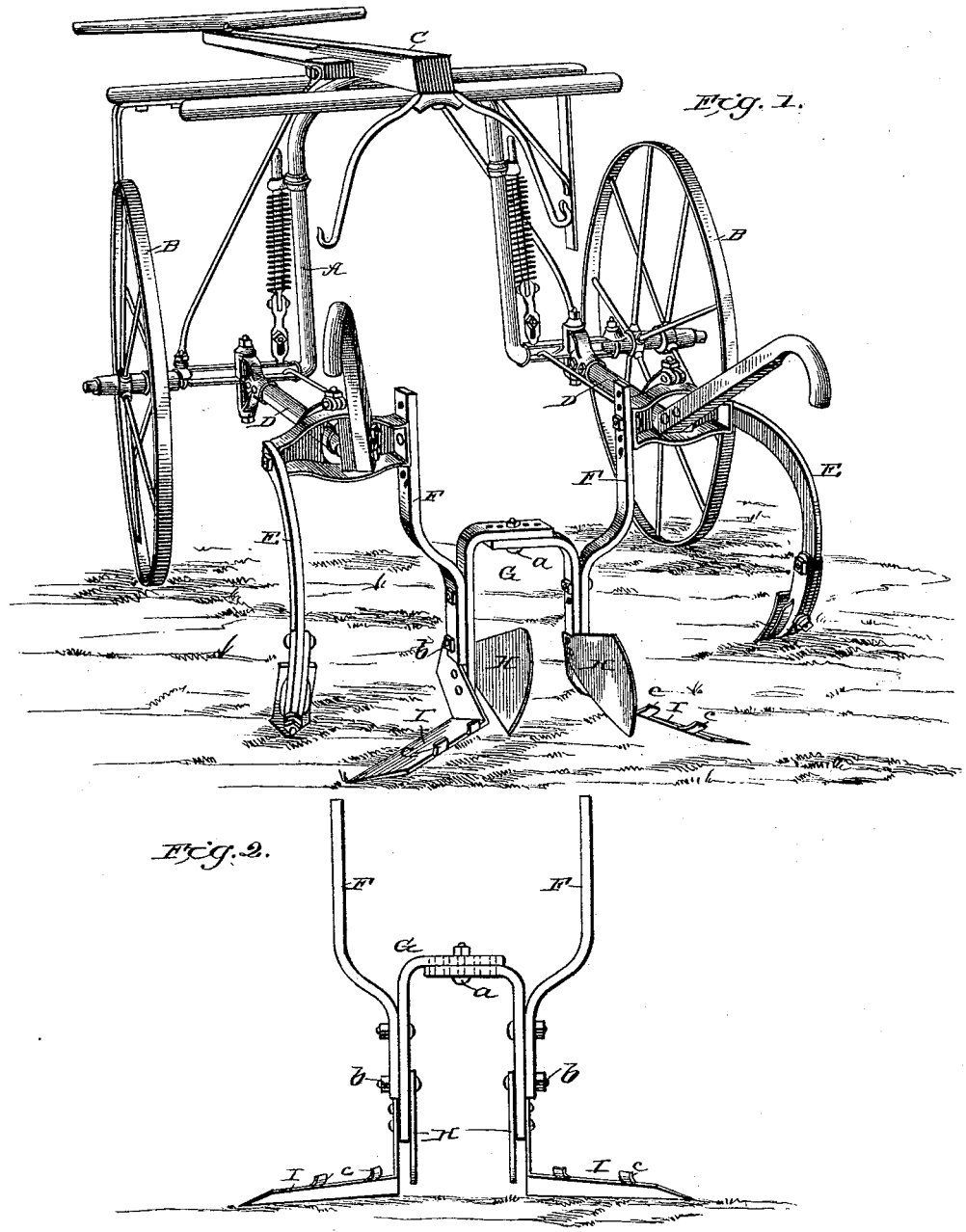
WITNESSES,
Edwin L. Yewell.
Jas. A. Ryan.
INVENTOR,
E. P. Lynch
By Phil T. Dodge
Attorney.

United States Patent Office.

EDWARD P. LYNCH, OF DAVENPORT, IOWA.

WHEEL-CULTIVATOR.

SPECIFICATION forming part of Letters Patent No. 389,158, dated September 4, 1888.

Application filed December 22, 1887. Serial No. 258,746. (No model.)

*To all whom it may concern:*

Be it known that I, EDWARD P. LYNCH, of Davenport, in the county of Scott and State of Iowa, have invented certain Improvements in Wheeled Cultivators for Listed Corn, &c., of which the following is a specification.

The aim of my present invention is to provide an implement particularly adapted for the cultivation of what is commonly known as "listed" corn—that is to say, corn growing in the bottom of a trench or furrow.

In carrying my invention into effect I take an ordinary wheeled cultivator having two laterally and vertically swinging beams, such as are usually provided with two shovels on each beam. I remove from each beam the inner shovel and unite the two beams by a downwardly-extending metallic connection having approximately a ∩ form, carrying at its lower end two upright guards or fenders adapted to pass on opposite sides of the corn and protect the same from the moving clods and earth, and also provided with two shares extending outward beyond the respective shares in a substantially horizontal direction, as hereinafter more fully explained.

In the accompanying drawings, Figure 1 represents in perspective, viewed from the rear, a cultivator provided with my improvement. Fig. 2 is an outline elevation of my cultivating devices, showing the position which they occupy when in action with respect to the furrows and the corn therein.

Referring to the drawings, A represents a centrally-arched axle supported at its ends by two ground-wheels, B, and provided with a pole or draft-tongue, C. D D represent two beams or drag-bars jointed at the front to the axle in such manner that their rear ends may swing both vertically and horizontally. The foregoing parts may all be constructed and arranged to operate in the same manner as in other existing machines, although I recommend the construction represented in Letters Patent of the United States granted to me on the 10th day of November, 1885, No. 329,921, in which the shovel-standards are carried by yokes pivoted vertically to the rear ends of the beams, as shown in the accompanying drawings.

The two beams are provided, as usual, with rearwardly-extending handles, by which to guide and control them, and the machine provided with draft devices and other customary parts necessary to its operation but foreign to my invention, and which need not, therefore, be detailed herein. Each beam is provided, as usual, at the rear end with an outer standard, E, carrying a shovel at its lower end.

In applying my improvement to the existing machine I remove the inner standard from each beam, and in place of these standards bolt to the beams or the standard-carrying yokes thereon two downwardly-extending bars, F, the lower ends of which are curved inward and rigidly united by a cross-connection, G, consisting of two bars, the upper ends of which are lapped horizontally upon each other and united by a bolt, $a$. The bars F and G constitute jointly a frame of ∩ form adapted to straddle the row of young corn. To the lower extremities of this ∩-frame I secure adjustably by fastening-bolts $b$, or otherwise, two upright guard plates or fenders, H. Outside of each fender I secure to the frame a share or cutter, I, consisting of an upright inner portion and of a portion extending outward and somewhat rearward in a substantially horizontal position. The forward edge of this share is sharpened throughout its horizontal, and preferably throughout its vertical, portion, whereby it is adapted to pass readily through the soil adjacent to the furrow, in order to sever and destroy the weeds. Each share is preferably, but not necessarily, provided at the rear edge with one or more upturned fingers, $c$, designed to disintegrate and loosen the soil. When the machine is in action, the fenders passing on opposite sides of the corn, as represented in Fig. 2, protect the same, while the blades extending outward on opposite sides of the furrow pass through the soil slightly below the surface, effectually destroying all vegetable growth. The outer shovels, E, act to loosen the soil between the trenches and beyond the extremities of the shares. The shares and fenders are both provided, as shown, with a series of bolt-holes, in order that they may be raised or lowered and otherwise adjusted in position, as the character of the soil or other controlling circumstances may demand.

The arms F are also provided with a series of bolt-holes, in order that the lister attachment may be raised or lowered in relation to the outer shovels. The two parts of the connection G are also provided with a series of bolt-holes, in order that the distance between the fenders and shares may be changed to suit the width of the trench or furrow containing the corn.

The improved attachment, being carried by the beams, may be moved bodily to the right and left and controlled as to its depth of action by means of the handles in the same manner that the ordinary shovels are controlled.

The essence of my invention resides in combining with the swiveling beams a frame or attachment provided with shares or cutters adapted to enter the soil on opposite sides of the trench.

Having thus described my invention, what I claim is—

1. In a cultivator, the wheeled frame and its two laterally and vertically swinging drag bars, each bar provided with an outside shovel, in combination with the intermediate ∩-shaped frame secured to the two drag-bars to straddle the standing corn, and the two shares I, extending outwardly from the respective arms of said connecting-frame.

2. The wheeled frame and its two laterally-swinging drag-bars, in combination with an intermediate frame or connection secured to the drag-bars, said intermediate frame provided with two downwardly-extending arms adapted to travel on opposite sides of the corn, each bar bearing an outwardly-extending share, I, and a guard or fender, H, substantially as described.

In testimony whereof I hereunto set my hand, this 7th day of September, 1887, in the presence of two attesting witnesses.

EDWARD P. LYNCH.

Witnesses:
  INGLE BARKER,
  GEO. J. BARKER.